(12) United States Patent
Byun (10) Patent No.: US 10,943,299 B2
(45) Date of Patent: Mar. 9, 2021

(54) ADJUSTING AND DISTRIBUTING LIQUIDITY

(71) Applicant: QARASOFT INC., Seoul (KR)

(72) Inventor: Changhwan Byun, Seoul (KR)

(73) Assignee: QARASOFT INC., Seoul (KR)

( * ) Notice: Subject to any disclaimer, the term of this patent is extended or adjusted under 35 U.S.C. 154(b) by 827 days.

(21) Appl. No.: 15/383,618

(22) Filed: Dec. 19, 2016

(65) Prior Publication Data

US 2017/0098277 A1 Apr. 6, 2017

Related U.S. Application Data

(63) Continuation of application No. PCT/KR2015/001682, filed on Feb. 23, 2015.

(30) Foreign Application Priority Data

Jun. 18, 2014 (KR) .................. KR10-2014-0073900

(51) Int. Cl.
*G06Q 40/00* (2012.01)
*G06Q 40/06* (2012.01)

(52) U.S. Cl.
CPC .................................. *G06Q 40/06* (2013.01)

(58) Field of Classification Search
CPC ..................................................... G06Q 40/06
See application file for complete search history.

(56) References Cited

U.S. PATENT DOCUMENTS

| 5,126,936 A | * | 6/1992 | Champion | ............. | G06Q 40/02 705/36 R |
| 5,812,987 A | * | 9/1998 | Luskin | .................. | G06Q 40/00 705/36 R |

(Continued)

FOREIGN PATENT DOCUMENTS

| KR | 10-2001-0091838 A | 10/2001 |
| KR | 10-2009-0036039 A | 4/2009 |

(Continued)

OTHER PUBLICATIONS

Anonymous, "Liquidity Account Explanation," www.AEFonline.org, 2014. (Year: 2014).*

(Continued)

*Primary Examiner* — Alexander G Kalinowski
*Assistant Examiner* — William B. Bunker
(74) *Attorney, Agent, or Firm* — Nelson Mullins Riley & Scarborough LLP; Kongsik Kim, Esq.

(57) ABSTRACT

Methods and systems are provided herein that relate generally to automatically adjusting and distributing liquidity among accounts according to strategies set in an investment pool. For example in one embodiment, in an environment that includes a server computer in which strategy information set by a user and including, as minimum information, basic investment information, investment ratio information, and maximum cumulative loss rate information, as well as financial institution account information linked to each strategy are stored, and a financial institution server of the financial institution that operates an account corresponding to the account information, the present disclosure relates generally to a method in which the server computer adjusts and distributes liquidity with regard to the account.

2 Claims, 4 Drawing Sheets

(56) References Cited

U.S. PATENT DOCUMENTS

| | | | |
|---|---|---|---|
| 7,624,059 B1* | 11/2009 | Jaffarian | G06Q 40/00 705/35 |
| 7,962,384 B2* | 6/2011 | Arena | G06Q 40/00 705/35 |
| 8,121,925 B1* | 2/2012 | Ives, Jr. | G06Q 40/00 705/36 R |
| 8,396,769 B1* | 3/2013 | Selig | G06Q 40/06 705/35 |
| 2005/0055300 A1* | 3/2005 | Kochansky | G06Q 40/06 705/36 R |
| 2007/0168270 A1* | 7/2007 | De Diego Arozamena | G06Q 40/00 705/36 R |
| 2007/0299786 A1* | 12/2007 | Bregstein | G06Q 40/00 705/36 R |
| 2008/0215499 A1* | 9/2008 | O'Neill | G06Q 40/06 705/36 R |
| 2012/0179495 A1* | 7/2012 | Yolles | G06Q 40/06 705/4 |
| 2013/0018818 A1* | 1/2013 | Yadav | G06Q 40/06 705/36 R |
| 2015/0221026 A1* | 8/2015 | Hong | G06Q 40/06 705/35 |

FOREIGN PATENT DOCUMENTS

| | | | | |
|---|---|---|---|---|
| KR | 10-2011-0103915 A | | 9/2011 | |
| KR | 10-2013-0020176 A | | 2/2013 | |
| WO | WO-03050654 A2 | * | 6/2003 | ............. G06Q 40/04 |
| WO | WO-2004081748 A2 | * | 9/2004 | ............. G06Q 40/04 |
| WO | WO-2006119580 A2 | * | 11/2006 | ............. G06Q 40/06 |

OTHER PUBLICATIONS

Anonymous, Maximum Drawdowns Explained, www.Investopedia.com, 2014 (Year: 2014).*

International Preliminart Report on Patentability for Intentional Application No. PCT/KR2015/001682, dated May 16, 2017, 6 pages.

* cited by examiner

ADJUSTING AND DISTRIBUTING LIQUIDITY

CROSS-REFERENCE TO RELATED APPLICATIONS

This application is a continuation of International Application No. PCT/KR2015/001682 filed on Feb. 23, 2015, which claims priority to Korean Application No. 10-2014-0073900 filed on Jun. 18, 2014. The applications are expressly incorporated herein by reference.

TECHNICAL FIELD

The present disclosure relates generally to automatically adjusting and distributing liquidity among accounts according to the strategies set in an investment pool.

BACKGROUND

There are some existing methods related to investment services currently in use. For example, a common method used with individuals is a technique relating to a method of providing a customized stock investment service to individuals. However, this is not a technique of automatically adjusting and distributing liquidity among the strategies or accounts set by a plurality of users.

SUMMARY

Methods and systems are provided herein for automatically adjusting and distributing liquidity among accounts of users linked to strategies in an investment pool where the investment is made according to strategies set by a plurality of users.

According to one aspect, a method is provided of adjusting and distributing liquidity in an environment that includes a server computer for storing information on a strategy set by a user with basic investment information, investment multiple information and maximum drawdown information as minimum information, and for storing financial institution account information linked to each strategy. The environment also includes a financial institution server of a financial institution in which an account corresponding to the account information is managed. The method of adjusting and distributing liquidity for the account by the server computer includes calculating a liquidity value requested for each account by the server computer. The method also includes determining whether a liquidity value requested for each user calculated based on the liquidity value requested for each account is larger than a maximum value of liquidity for each user by the server computer. The method also includes calculating, if the liquidity value requested for each user is larger than the maximum value of liquidity for each user as a result of the determination above, a transferable liquidity value for all accounts after calculating an adjusted liquidity value requested for each account by the server computer. The method further includes calculating, if the liquidity value requested for each user is not larger than the maximum value of liquidity for each user as a result of the determination above, the transferable liquidity value for all accounts by the server computer. The method also includes calculating a guaranteed liquidity value for each account by the server computer. The method further includes calculating a guaranteed area and a non-guaranteed area for each account by the server computer. The method also further includes calculating a value to be allocated to each account by distributing a value of the non-guaranteed area to each account after preferentially distributing and allocating a value of the guaranteed area to each account from the transferable liquidity value for all accounts (a total allocable amount) by the server computer.

The method can have numerous variations. For example, the method can include determining whether a product of a smallest request amount and a total number of requests is larger than or equal to a total allocable amount. The method can also include allocating, if it is determined that the product is larger than or equal to the total allocable amount, a value obtained by dividing the total allocable amount by the total number of requests as a dividend of each account, setting the total allocable value to zero, and terminating the distribution process. The method can further includes allocating, if it is determined that the product is smaller than the total allocable amount, a smallest request amount for each request, reducing a request amount of each account as much as the smallest request amount, and reducing the total allocable amount as much as the smallest request amount and the total number of requests. The method can also include determining whether there is a request with a request amount larger than zero, if there is a request with a request amount larger than zero, and terminating the distribution process if there is no request with a request amount larger than zero.

The method can also include calculating a liquidity value requested for each account based on a fixed request amount and a variable request amount of the account. Calculating a liquidity value requested for each account can be carried out by the equation shown below.

Liquidity actually used for account balance=Math.Min(liquidity currently used in the account, total deposit of corresponding account–orderable total amount)

Liquidity value requested for each account=Math.Max(fixed request amount, liquidity actually used for account balance+variable request amount)     [Equation]

Throughout the disclosure, Math.Min( )and Math.Max( )can represent computer code functions that will be understood by one skilled in the art.

Calculating the liquidity value requested for each user can also include calculating a liquidity value requested for each strategy by adding the liquidity value requested for each account linked to a strategy set by a corresponding user on the basis of strategy. Calculating the liquidity value requested for each user can further include calculating the liquidity value requested for each user by adding the liquidity value requested for each strategy.

Calculating an adjusted liquidity value requested for each account can further include calculating a first value, which is a difference between the maximum value of liquidity for each user and the liquidity value requested for each user. Calculating an adjusted liquidity value requested for each account can also include calculating a second value which should be reduced for each strategy by multiplying a ratio of the liquidity value requested for each strategy to a sum of the liquidity value requested for each strategy of a corresponding user by the first value. Calculating an adjusted liquidity value requested for each account can include calculating a third value which should be reduced for each account by multiplying a ratio of the liquidity value requested for each account to a sum of the liquidity value requested for each account linked to each strategy by the second value. Calculating an adjusted liquidity value requested for each account can further include calculating the adjusted liquidity value requested for each account by subtracting the third value from the liquidity value requested for each account.

Calculating a guaranteed liquidity value for each account can include distributing a capital of the user to each strategy as a guaranteed liquidity value of each strategy according to a ratio of a maximum loss of each strategy to a sum of maximum losses of all strategies of the corresponding user. Calculating a guaranteed liquidity value for each account can also include calculating the guaranteed liquidity value of each strategy distributed as a guaranteed liquidity value for each account according to a ratio of the fixed request amount for an account linked to each strategy and distributing the guaranteed liquidity value for each account.

Calculating a guaranteed area and a non-guaranteed area for each account can include setting the larger of a value obtained by subtracting an non-transferable portion from the adjusted liquidity value requested for each account and zero as a fourth value that is a value of a portion requested by the account. Calculating a guaranteed area and a non-guaranteed area for each account can also include setting the larger of a value obtained by subtracting a difference between the adjusted liquidity value requested for each account and the guaranteed liquidity value for each account from the fourth value and zero as the value of the guaranteed area. Calculating a guaranteed area and a non-guaranteed area for each account can further include setting a value obtained by subtracting the value of the guaranteed area from the fourth value as the value of the non-guaranteed area.

Automatically adjusting and distributing liquidity among accounts linked in an investment pool including a plurality of users and strategies can thus be achieved.

BRIEF DESCRIPTION OF THE DRAWINGS

The invention will be more fully understood from the following detailed description taken in conjunction with the accompanying drawings, in which.

DETAILED DESCRIPTION

Certain exemplary embodiments will now be described to provide an overall understanding of the principles of the functions and uses of the systems and methods disclosed herein. One or more examples of these embodiments are illustrated in the accompanying drawings. Those skilled in the art will understand that the systems and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Figure 1:
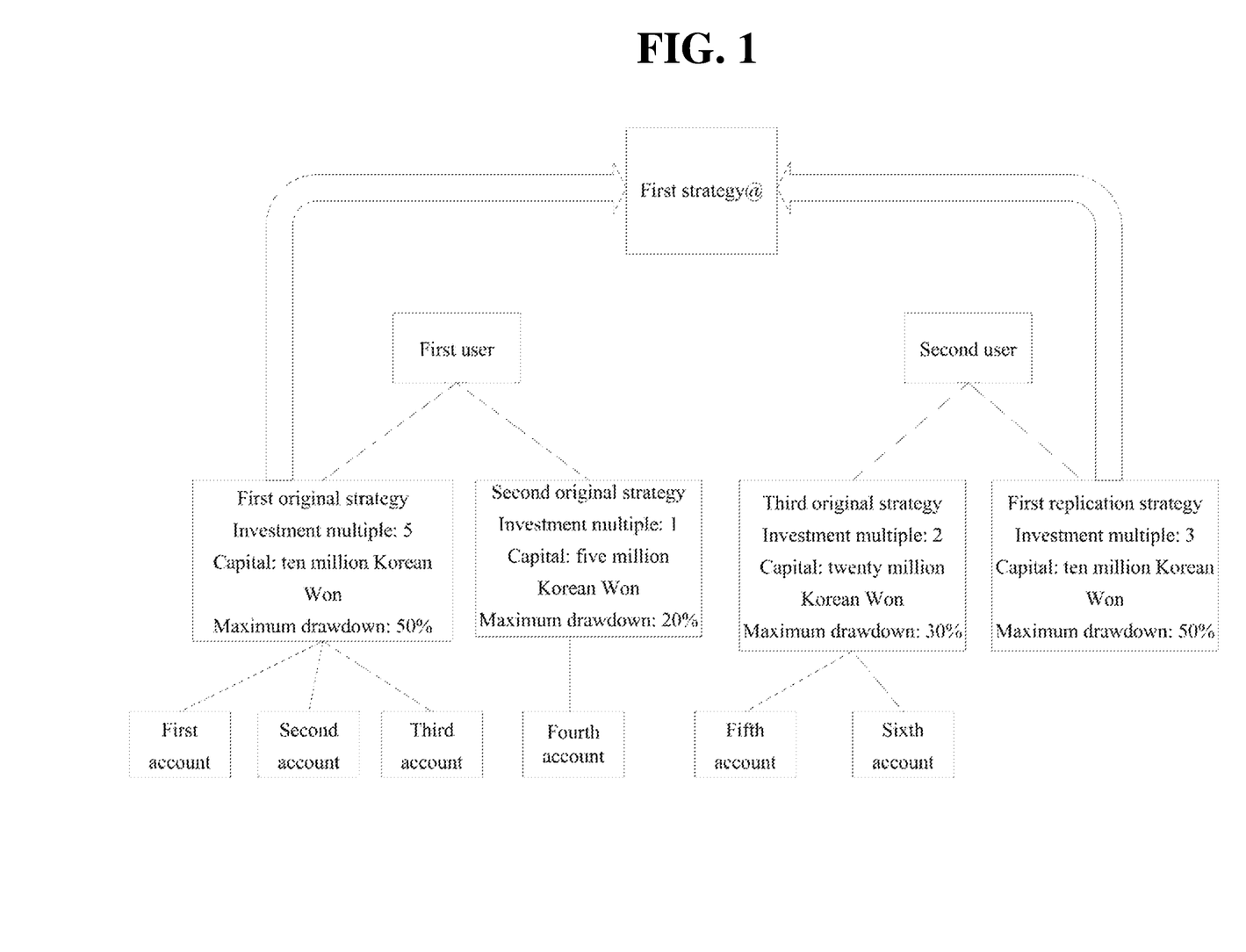
FIG. 1 is a view showing a relation among users, strategies, and accounts in an environment for carrying out the present disclosure.
Figure 2:
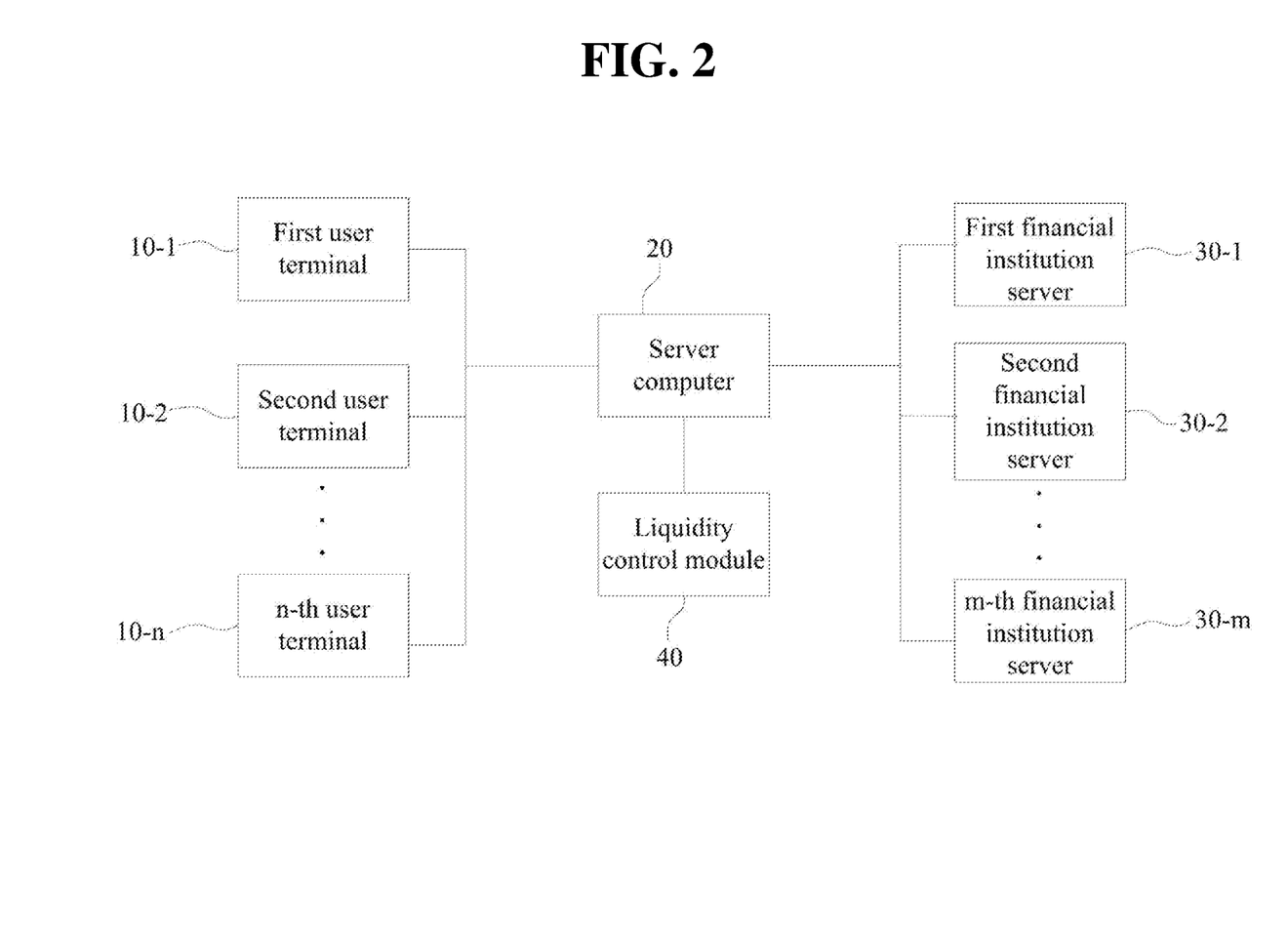
FIG. 2 is a view showing constitutional components of an environment for carrying out the present disclosure.

FIG. 1 illustrates a relation among users, strategies, and accounts and is a prerequisite condition of a method of distributing profits. FIG. 2 is a view showing a system relation of an environment for carrying out the present disclosure. A strategy can be classified into an original strategy and a replication strategy. The replication strategy means a strategy set to follow basic investment information and a maximum drawdown of an original strategy of another user. The original strategy means a strategy set by a user, which is not a replication copying a strategy of another user. Unless otherwise mentioned, a "strategy" means an "original strategy." Although it is assumed in FIG. 1 that there are two users for simplifying explanation, the discussion herein can be applied when three or more users and/or a plurality of users are in the investment pool by expanding numbers.

The original strategy and the replication strategy are respectively set by a user and stored in a server computer 20, and unless otherwise mentioned, all the processes described below are carried out by the server computer 20 and/or an electronic computing device. A liquidity control module 40 is provided in the server computer 20. Although the liquidity control module 40 is expressed as a separate component for the convenience of explanation, the liquidity control module 40 may be integrated in the server computer 20 or provided as separate components as a logical combination of general-purpose hardware and software carrying out functions of the hardware.

Each of the users can input information that can be recorded and stored in the server computer through a user terminal 10-1 to 10-$n$. In addition, related information can be transferred to a subject that operates the server computer 20 in an offline environment so that the corresponding information can be recorded and stored in the server computer 20. The server computer 20 is connected to financial institution servers 30-1 to 30-$m$ through a communication network to enable data communication with each other for liquidity share control, described further below.

The concept of a strategy included in an investment pool will be described through an example shown in FIG. 1. The minimum information shown in the strategies of FIG. 1 is merely an example, and numerical values thereof can be changed without restriction.

A first user can set a first original strategy and a second original strategy, and a second user can set a third original strategy and a first replication strategy. At a minimum, the original strategies can include basic investment information, investment multiple information, and a maximum drawdown (MDD). Additional information can be provided. A financial institution account can be linked to each of the original strategies. The basic investment information can be information on the fund necessarily required to carry out a corresponding strategy, and if a loss larger than the maximum drawdown occurs, steps such as canceling the corresponding account or suspending transactions can be taken immediately so that the loss does not increase and/or continue.

A plurality of accounts can be linked to each of the strategies like the first and third original strategies, or a single account may be linked to a strategy like the second original strategy. The second user can set the first replication strategy following the first original strategy. Although the replication strategy follows the original strategy in the basic investment information and the maximum drawdown, the investment multiple can be set to be different from that of the original strategy. If the original strategy liquidates or extinguishes, the replication strategy following the original strategy can follow the same liquidation or extinguishment. The first original strategy and the first replication strategy can be combined as a sum like the "first strategy@," as illustrated in FIG. 1. Account information is not linked to the replication strategy, but the replication strategy can be managed in an account linked to the first original strategy. The second user can set a replication strategy following the first original strategy of the first user when the second user desires to pursue profits by following the first original strategy if the rate of return of the first original strategy is successful.

Accounts, such as the first to sixth accounts illustrated in FIG. 1, are accounts opened in a financial institution in the name of an investment pool, and the investment pool can request the financial institution servers 30-1 to 30-$m$ to process transfer of an amount determined through a distribution process using a liquidity sharing algorithm described further below. The first user and the second user can make investments through an account of a financial institution according to a strategy, and if a profit or loss is generated therefrom, the profit or loss can be distributed in a method described further below. If it is assumed that a profit or loss generated in a specific account is A, the investment multiple of the original strategy is "B", and the investment multiple of the replication strategy is "C", a profit or loss to be distributed to the original strategy (a profit or loss of the original strategy) and a profit or loss to be distributed to the replication strategy (a profit or loss of the replication strategy) can be determined by the equation shown below.

$$\text{Profit or loss of original strategy} = A \times \{B/(B+C)\}$$

$$\text{Profit or loss of replication strategy} = A \times \{C/(B+C)\} \quad [\text{Equation 1}]$$

Meanwhile, because the replication strategy can be a strategy set to follow the original strategy depending on the profitability of the original strategy, a portion of the profit to be distributed to the replication strategy can be set aside and further distributed as an additional profit of the original strategy. By doing so, a user who has set the original strategy can take an additional outcome in addition to the investment outcome based on the basic investment and the investment multiple if another user sets the replication strategy.

Figure 3:
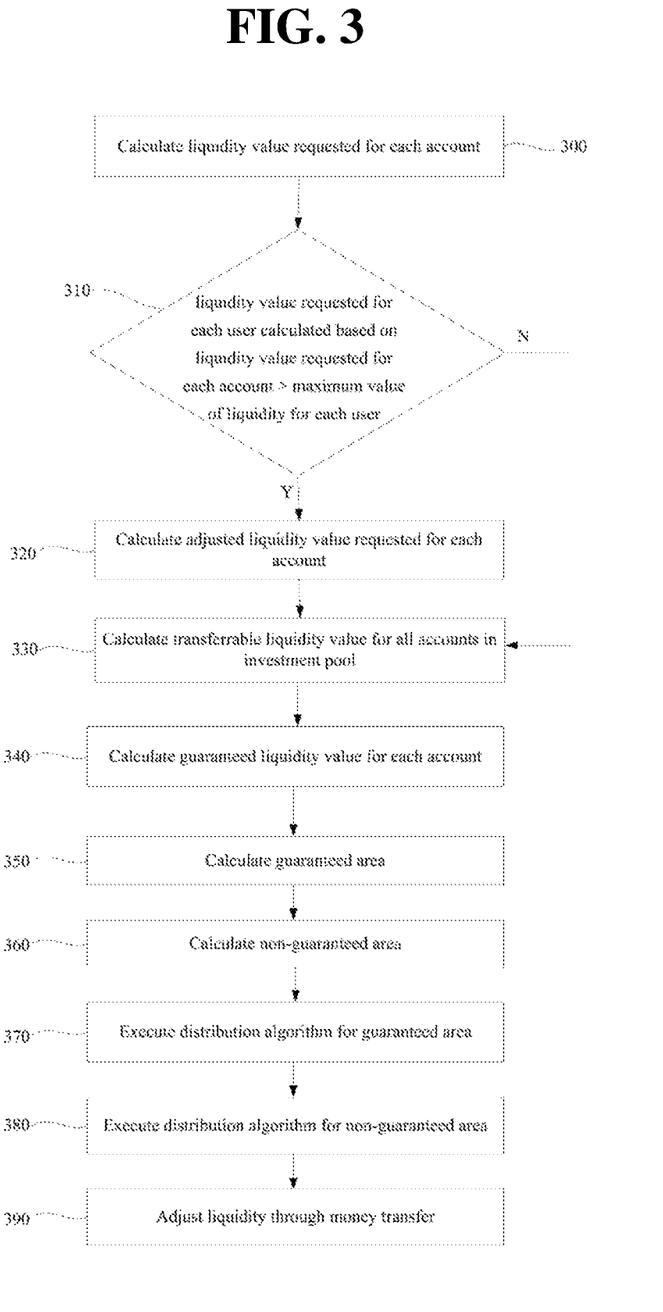
FIG. 3 is a flowchart illustrating a liquidity control process of the present disclosure.
Figure 4:
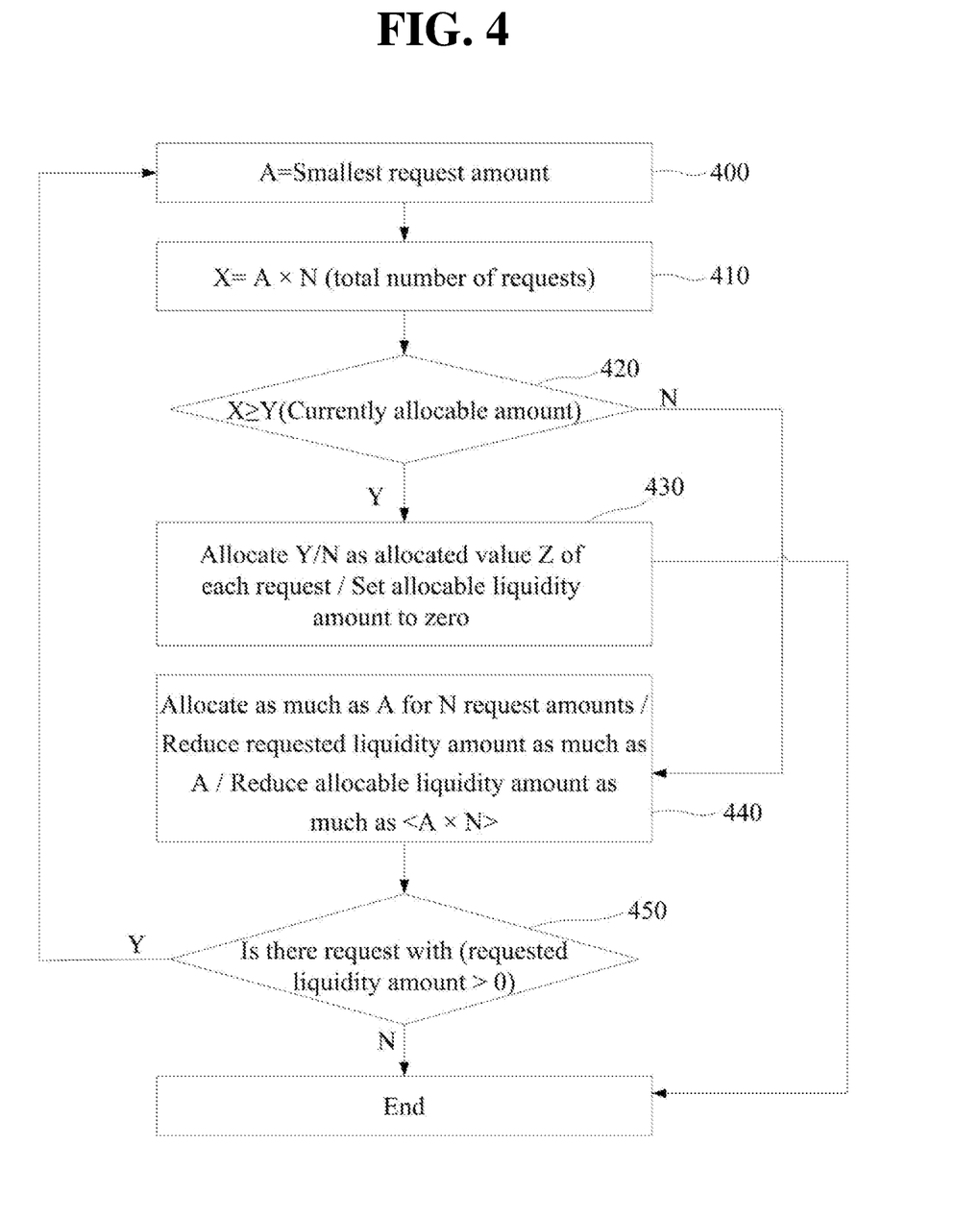
FIG. 4 is a flowchart illustrating an algorithm for distributing values of a guaranteed area and values of a non-guaranteed area in the liquidity control process.

Hereinafter, a method of adjusting and distributing liquidity for each user, strategy, and account are provided with reference to FIGS. 3 and 4. A user can pay an equity capital to an investment pool, can set a strategy, can make investment(s) according to the strategy thereto, and can receive an outcome shared as a result thereof, and the user can pursue a leverage effect by making investment(s) with an amount larger than the basic investment set in the strategy by setting an investment multiple in the strategy. However, because an amount larger than the capital is in a non-guaranteed area, adjustment and distribution of the liquidity are needed.

Hereinafter, an algorithm for adjusting liquidity and a method of distributing the liquidity are provided. A flowchart of the major process in the algorithm for adjusting liquidity is shown in FIG. 3, and a flowchart of an algorithm for distributing a guaranteed area and a non-guaranteed area described further below is shown in FIG. 4. The process of adjusting and distributing liquidity is carried out by a server computer 20 and/or an electronic computing device. In the process shown in the flowchart of FIG. 3, the order of preceding and following steps may be changed regardless of the order described in the appended claims if a preceding step is not a condition prerequisite to the following step, and it should be clearly understood that a method following the order changed like this is also included in the scope of the present disclosure.

In the method of adjusting and distributing liquidity, first, a liquidity value requested for each account can be calculated (step 300). A fixed request amount and a variable request amount can be set by a user for the accounts linked to the original strategy, and such information is stored in the server computer 20. The fixed request amount can be an amount requested to maintain a stock purchase value (or a used margin) and cash flow to be higher than the corresponding amount. The variable request amount can be a cash flow amount requested to maintain at a higher level than the corresponding amount. A maximum value set for the fixed request amount and the variable request value can be an amount corresponding to a predetermined multiple of the capital. The predetermined multiple can be a value set in an investment pool, which is variable.

The liquidity value requested for each account can be determined by the equation shown below.

$$\begin{aligned}&\text{Liquidity actually used for account}\\&\quad\text{balance} = \text{Math.Min}(\text{liquidity currently used in}\\&\quad\text{the account, total deposit of the corresponding}\\&\quad\text{account-orderable total amount})\end{aligned}$$

$$\begin{aligned}&\text{Liquidity value requested for each}\\&\quad\text{account} = \text{Math.Max}(\text{fixed request amount},\\&\quad\text{liquidity actually used for account balance} +\\&\quad\text{variable request amount}) \quad [\text{Equation 2}]\end{aligned}$$

Next, step 310 can be executed to determine whether the liquidity value requested for each user, which is calculated based on the liquidity value requested for each account, is larger than a maximum value of liquidity for each user. The maximum value of liquidity for each user can be an amount corresponding to a predetermined multiple of the capital of the corresponding user and can be set at various values, for example an amount corresponding to five times of the capital. A liquidity value requested for each strategy linked to corresponding account(s) can be calculated by adding the liquidity value requested for each account that is calculated through the process described above, and the liquidity value requested for each user can be calculated by adding the liquidity value requested for each strategy calculated like the disclosure herein.

Step 320 can be executed if the liquidity value requested for each user is larger than the maximum value of liquidity for each user as a result of the determination at step 310, and step 330 can be executed otherwise. In step 320, an adjusted liquidity value requested for each account can be calculated as described further below.

First, a first value, which can be a difference between the maximum value of liquidity for each user and the liquidity value requested for each user, is calculated. A second value, which should be reduced for each strategy, can be calculated by multiplying a ratio of the liquidity value requested for each strategy to the sum of the requested liquidity value(s) of each strategy by the first value. Next, a third value, which should be reduced for each account, can be calculated by multiplying a ratio of the liquidity value requested for each account to the sum of the requested liquidity values of each account linked to each strategy by the second value. Then, an adjusted liquidity value requested for each account can be calculated by subtracting the third value from the liquidity value requested for each account.

At step 330, a transferrable liquidity value for all accounts in the investment pool can be calculated. This step is not necessarily carried out after calculating the adjusted liquidity value requested for each account, and it is acceptable for the step to be carried out only before the distribution algorithm is carried out for a guaranteed area and a non-guaranteed area, as described further below. The transferrable liquidity value for all accounts is calculated as an amount obtained by subtracting currently used liquidity (a holding asset, a used margin and a stock purchase value) from the total liquidity of the investment pool.

Next, step 340 can be executed to calculate a guaranteed liquidity value for each account. The guaranteed liquidity value for each account can be calculated by the following method. First, the capital of a user can be distributed to each strategy as a guaranteed liquidity value of each strategy according to a ratio of a maximum loss of each strategy to the sum of maximum losses of all strategies of the user. A maximum loss of a strategy is determined by (investment multiple×basic investment×MDD). Then, the guaranteed liquidity value of each strategy calculated like this can be distributed to the account(s) linked to a corresponding strategy, and the distribution ratio can be determined according to the ratio of the fixed request amount set for each account, and a value calculated like this becomes a guaranteed liquidity value for each account. If the guaranteed liquidity value for each account is calculated, steps 350 and 360 are executed to calculate a guaranteed area and a non-guaranteed area. The specific method of calculating the guaranteed area and the non-guaranteed area are described further below.

The larger of a value obtained by subtracting a non-transferable portion (e.g., a basic investment, a stock settlement fund, an order margin and the like) from an adjusted liquidity value requested for each account and zero can be set as a fourth value. The fourth value means a portion that a corresponding account requests to a transferrable liquidity value of an investment pool. Subsequently, the larger of a value obtained by subtracting <an adjusted liquidity value requested for each account—a guaranteed liquidity value for each account>from the fourth value and zero is set as a value of the guaranteed area. In addition, a value obtained by subtracting the value of the guaranteed area from the fourth value can be set as a value of the non-guaranteed area. If a value of the guaranteed area and a value of the non-guaranteed area are determined like this, a distribution algorithm can be carried out for the guaranteed area and the non-guaranteed area to finally determine a transfer amount for satisfying the liquidity calculated for each account. The flowchart of the distribution algorithm is illustrated in FIG. 4.

First, the distribution algorithm can be carried out for the guaranteed area. A smallest request amount among the values of the guaranteed area requested by the accounts can be set as A at step 400, and value X can be calculated at step 410 by multiplying the total number of requests N by A. Whether value X is larger than a liquidity value (a total allocable amount; Y) transferrable for all accounts is determined at step 420. Step 430 is executed if value X is larger than or equal to value Y, and step 440 is executed otherwise. At step 430, a value of Y/N is allocated as a dividend Z of each request, and the process is terminated after setting an allocable liquidity amount to zero.

At step 440, after allocating an amount of A for N request amounts at step 440 and reducing the requested liquidity amount (a value of the guaranteed area) of each account as much as A, the allocable liquidity amount can be reduced as much as <A×N>. Subsequently, step 450 can be executed to determine whether there is a request with a requested liquidity amount larger than zero, and if there is a request with a requested liquidity amount larger than zero, the flow returns to step 400 and repeats the steps described above.

If the distribution process for the guaranteed area is completed through the process described above, next, distribution amounts can be determined for the accounts in the non-guaranteed area according to the same algorithm. If values of the guaranteed area and values of the non-guaranteed area are determined like this, a fifth value can be calculated by the equation shown below.

Fifth value=Current total deposit amount of account=(non-transferable amount of the account+Value of guaranteed area+Value of non-guaranteed area)  [Equation 3]

If the fifth value is a positive value, it means that an amount corresponding to the value is transferable to another account, and if the fifth value is a negative value, it means that an amount corresponding to an absolute value of the negative value should be transferred from another account. A variety of methods can be used to determine from which account the amount should be transferred to which account, and for example, the transfer can be repeatedly performed in a method of transferring from an account having the largest positive value to an account having the smallest negative value. The transfer can be performed by sending a transfer command from the server computer 20 to the financial institution servers 30-1 to **30-*m***.

While the present disclosure has been described with reference to the accompanying drawings, the scope of the present disclosure is not restricted by the embodiments and/or the drawings described herein but only by the appended claims. It is to be appreciated that those skilled in the art can improve, change, or modify the embodiments without departing from the scope and spirit of the present disclosure.

What is claimed is:

1. A method of adjusting and distributing liquidity among accounts according to strategies set in an investment pool, in an environment including:

a server computer in electronic communication with computing devices associated with a plurality of users who are investors in the investment pool, wherein the server computer is configured to store information of an original strategy set by a first user, which includes at least basic investment information, investment multiple, and maximum drawdown, and configured to store financial institution account information linked to the original strategy, wherein the server computer is configured to store information of a replication strategy set by a second user which follows the original strategy; and a financial institution server of a financial institution in which a plurality of accounts are opened in the name of the investment pool which correspond to the account information of the original strategy, wherein the server computer is in electronic communication with the financial institution server in order to manage the accounts by transferring amounts determined through a method of adjusting and distributing liquidity among the accounts by the server computer, the method comprising:

calculating by the server computer a liquidity requested for each account;

determining by the server computer whether a liquidity requested for each user, which is calculated based on the liquidity requested for each account, is larger than a maximum value of liquidity for each user;

if the liquidity requested for each user is larger than the maximum value of liquidity for each user, calculating by the server computer a transferable liquidity for all accounts after calculating an adjusted liquidity requested for each account;

if the liquidity requested for each user is not larger than the maximum value of liquidity for each user, calculating by the server computer the transferable liquidity for all accounts;

calculating by the server computer a guaranteed liquidity for each account;

calculating by the server computer a guaranteed area and a non-guaranteed area for each account; and calculating by the server computer a value to be allocated to each account by distributing a value of the non-guaranteed area to each account after preferentially distributing and allocating a value of the guaranteed area to each account from the transferable liquidity for all accounts, wherein calculating by the server computer a liquidity requested for each account is carried out by an equation shown below:

Liquidity actually used for account balance=Math.Min(liquidity currently used in the account, total deposit of corresponding account−orderable total amount)

Liquidity requested for each account=Math.Max (fixed request amount, liquidity actually used for account balance+variable request amount);

wherein the liquidity requested for each user is calculated by the server computer using the steps of:
calculating a liquidity requested for each strategy by adding the liquidity requested for each account linked to a strategy set by a corresponding user on the basis of strategy; and
calculating the liquidity requested for each user by adding the liquidity requested for each strategy;

wherein calculating by the server computer an adjusted liquidity requested for each account includes:
calculating a first value, which is a difference between the maximum value of liquidity for each user and the liquidity requested for each user;
calculating a second value that should be reduced for each strategy by multiplying a ratio of the liquidity requested for each strategy to a sum of the liquidity requested for each strategy of a corresponding user by the first value;
calculating a third value that should be reduced for each account by multiplying a ratio of the liquidity requested for each account to a sum of the liquidity requested for each account linked to each strategy by the second value; and
calculating the adjusted liquidity requested for each account by subtracting the third value from the liquidity requested for each account;

wherein calculating by the server computer a guaranteed liquidity for each account includes:
distributing a capital of the user to each strategy as a guaranteed liquidity of each strategy according to a ratio of a maximum loss of each strategy to a sum of maximum losses of all strategies of the corresponding user; and
calculating the guaranteed liquidity of each strategy distributed as a guaranteed liquidity for each account according to a ratio of the fixed request amount for an account linked to each strategy and distributing the guaranteed liquidity for each account;

wherein calculating by the server computer a guaranteed area and a non-guaranteed area for each account includes:
setting a larger of a value obtained by subtracting a non-transferable portion from the adjusted liquidity requested for each account and zero as a fourth value that is a value of a portion requested by the account;
setting a larger of a value obtained by subtracting a difference between the adjusted liquidity requested for each account and the guaranteed liquidity for each account from the fourth value and zero as the value of the guaranteed area; and
setting a value obtained by subtracting the value of the guaranteed area from the fourth value as the value of the non-guaranteed area; and wherein distributing by the server computer a value of the guaranteed area and a value of the non-guaranteed area includes:
determining whether a product of a smallest request amount and a total number of requests is larger than or equal to a total allocable amount;
if it is determined that the product is larger than or equal to the total allocable amount, allocating a value obtained by dividing the total allocable amount by the total number of requests as a dividend of each account, setting the total allocable value to zero, and terminating the distribution process;
if it is determined that the product is smaller than the total allocable amount, allocating a smallest request amount for each request, reducing a request amount of each account as much as the smallest request amount, and reducing the total allocable amount as much as the smallest request amount and the total number of requests; and
determining whether there is a request with a request amount larger than zero, repeating the steps provided above if there is a request with a request amount larger than zero, and terminating the distribution process if there is no request with a request amount larger than zero.

2. A method of adjusting and distributing liquidity among accounts according to strategies set in an investment pool, in an environment including:
a user input terminal configured to receive inputs from a first user among a plurality of users who are investors in the investment pool and allow the first user to set an original strategy;
a server computer in electronic communication with the user input terminal, wherein the server computer is configured to store information of the original strategy set by the first user, which includes at least basic investment information, investment multiple, and maximum drawdown, and configured to store financial institution account information linked to the original strategy, wherein the server computer is configured to store information of a replication strategy set by a second user which follows the original strategy; and
a financial institution server of a financial institution in which a plurality of accounts are opened in the name of the investment pool which correspond to the account information of the original strategy, wherein the server computer is in electronic communication with the financial institution server in order to manage the accounts by transferring amounts determined through a method of adjusting and distributing liquidity among the accounts by the server computer, the method comprising:

calculating by a liquidity control module on the server computer a liquidity requested for each account;

determining by the liquidity control module whether a liquidity requested for each user, which is calculated based on the liquidity requested for each account, is larger than a maximum value of liquidity for each user;

if the liquidity requested for each user is larger than the maximum value of liquidity for each user, calculating by the liquidity control module a transferable liquidity for all accounts after calculating an adjusted liquidity requested for each account;

if the liquidity requested for each user is not larger than the maximum value of liquidity for each user, calculating by the liquidity control module the transferable liquidity for all accounts;

calculating by the liquidity control module a guaranteed liquidity for each account;

calculating by the liquidity control module a guaranteed area and a non-guaranteed area for each account; and calculating by the liquidity control module a value to be allocated to each account by distributing a value of the non-guaranteed area to each account after preferentially distributing and allocating a value of the guaranteed area to each account from the transferable liquidity for all accounts, wherein calculating by the liquidity control module a liquidity requested for each account is carried out by an equation shown below:

Liquidity actually used for account balance=Math.Min(liquidity currently used in the account, total deposit of corresponding account−orderable total amount)

Liquidity requested for each account=Math.Max (fixed request amount, liquidity actually used for account balance+variable request amount);

wherein the liquidity requested for each user is calculated by the liquidity control module using the steps of:
  calculating a liquidity requested for each strategy by adding the liquidity requested for each account linked to a strategy set by a corresponding user on the basis of strategy; and
  calculating the liquidity requested for each user by adding the liquidity requested for each strategy;

wherein calculating by the liquidity control module an adjusted liquidity requested for each account includes:
  calculating a first value, which is a difference between the maximum value of liquidity for each user and the liquidity requested for each user;
  calculating a second value that should be reduced for each strategy by multiplying a ratio of the liquidity requested for each strategy to a sum of the liquidity requested for each strategy of a corresponding user by the first value;
  calculating a third value that should be reduced for each account by multiplying a ratio of the liquidity requested for each account to a sum of the liquidity requested for each account linked to each strategy by the second value; and
  calculating the adjusted liquidity requested for each account by subtracting the third value from the liquidity requested for each account;

wherein calculating by the liquidity control module a guaranteed liquidity for each account includes:
  distributing a capital of the user to each strategy as a guaranteed liquidity of each strategy according to a ratio of a maximum loss of each strategy to a sum of maximum losses of all strategies of the corresponding user; and
  calculating the guaranteed liquidity of each strategy distributed as a guaranteed liquidity for each account according to a ratio of the fixed request amount for an account linked to each strategy and distributing the guaranteed liquidity for each account;

wherein calculating by the liquidity control module a guaranteed area and a non-guaranteed area for each account includes:
  setting a larger of a value obtained by subtracting a non-transferable portion from the adjusted liquidity requested for each account and zero as a fourth value that is a value of a portion requested by the account;
  setting a larger of a value obtained by subtracting a difference between the adjusted liquidity requested for each account and the guaranteed liquidity for each account from the fourth value and zero as the value of the guaranteed area; and
  setting a value obtained by subtracting the value of the guaranteed area from the fourth value as the value of the non-guaranteed area; and wherein distributing by the server computer a value of the guaranteed area and a value of the non-guaranteed area includes:
  determining whether a product of a smallest request amount and a total number of requests is larger than or equal to a total allocable amount;
  if it is determined that the product is larger than or equal to the total allocable amount, allocating a value obtained by dividing the total allocable amount by the total number of requests as a dividend of each account, setting the total allocable value to zero, and terminating the distribution process;
  if it is determined that the product is smaller than the total allocable amount, allocating a smallest request amount for each request, reducing a request amount of each account as much as the smallest request amount, and reducing the total allocable amount as much as the smallest request amount and the total number of requests; and
  determining whether there is a request with a request amount larger than zero, repeating the steps provided above if there is a request with a request amount larger than zero, and terminating the distribution process if there is no request with a request amount larger than zero.

* * * * *